(12) United States Patent
Al Zanati et al.

(10) Patent No.: US 9,329,258 B2
(45) Date of Patent: May 3, 2016

(54) METHOD FOR DETERMINING, IN A FIXED 3D FRAME OF REFERENCE, THE LOCATION OF A MOVING CRAFT, AND ASSOCIATED COMPUTER PROGRAM AND DEVICE

(71) Applicant: INRIA INSTITUT NATIONAL DE RECHERCHE EN INFORMATIQUE ET EN AUTOMATIQUE, Le Chesnay (FR)

(72) Inventors: Stefano Al Zanati, San Cesareo (IT); Chiara Troiani, Grenoble (FR); Agostino Martinelli, Grenoble (FR)

(73) Assignee: Inria Institut National De Recherche En Informatiq, Rocquencourt, Le Chesnay (FR)

( * ) Notice: Subject to any disclaimer, the term of this patent is extended or adjusted under 35 U.S.C. 154(b) by 0 days.

(21) Appl. No.: 14/443,845

(22) PCT Filed: Nov. 19, 2013

(86) PCT No.: PCT/EP2013/074149
§ 371 (c)(1),
(2) Date: May 19, 2015

(87) PCT Pub. No.: WO2014/076294
PCT Pub. Date: May 22, 2014

(65) Prior Publication Data
US 2015/0293207 A1    Oct. 15, 2015

(30) Foreign Application Priority Data

Nov. 19, 2012 (FR) ...................... 12 60963

(51) Int. Cl.
*G06K 9/00* (2006.01)
*G01S 5/16* (2006.01)
*G05D 1/10* (2006.01)
*G05D 1/08* (2006.01)

(52) U.S. Cl.
CPC .............. *G01S 5/163* (2013.01); *G05D 1/0808* (2013.01); *G05D 1/101* (2013.01); *G06K 9/0063* (2013.01)

(58) Field of Classification Search
CPC ................... G06K 2009/2045; G06T 2200/32; G06T 2207/30181; G06T 7/0028; H01M 10/36; H01M 4/625; H01M 6/18; H01M 4/06; B01D 21/0045; B01D 2221/14; B01D 2247/04; B01D 2247/12; B01D 47/06; B65D 77/067; B67D 1/0412; B67D 2001/0827; Y02E 60/12
USPC .......................................... 382/104
See application file for complete search history.

(56) References Cited

U.S. PATENT DOCUMENTS

| | | | |
|---|---|---|---|
| 8,902,308 B2 * | 12/2014 | Rinner et al. | ................. 348/117 |
| 9,074,892 B2 * | 7/2015 | Fink | |
| 2008/0195316 A1 | 8/2008 | Krishnaswamy | |
| 2012/0232718 A1 * | 9/2012 | Rischmuller et al. | ............. 701/2 |
| 2012/0308084 A1 * | 12/2012 | Perrier et al. | ................. 382/107 |

FOREIGN PATENT DOCUMENTS

| | | |
|---|---|---|
| EP | 2144038 A2 | 1/2010 |
| EP | 2372656 A2 | 10/2011 |

OTHER PUBLICATIONS

Martinelli, Agostino, Vision and IMU Data Fusion: Closed-Form Solutions for Attitude, Speed, Absolute Scale, and Bias Determination, IEEE Transactions on Robotics, vol. 28 No. 1, pp. 44-60, Feb. 2012.

Beall, Chris, et al., Attitude Heading Reference System with Rotation-Aiding Visual Landmarks, 15th International Conference on Information Fusion, IEEE, pp. 976-982, Jul. 2012.

Weiss, Stephan, Vision Based Navigation for Micro Helicopters, pp. 1-205, Jan. 2012.

\* cited by examiner

Primary Examiner — Tom Y Lu
(74) Attorney, Agent, or Firm — Maynard, Cooper & Gale, P.C.; Brian Sattizahn

(57) ABSTRACT

Method for locating, in a fixed frame of reference (RG), a moving craft from the craft, comprising two characteristic points, the rolling and pitching of the craft in the fixed frame of reference having been determined, so as to determine the yawing and/or the coordinates of the craft in the fixed frame of reference: a/ a local frame of reference ($R_n$) comprising an axis deviating from the yaw axis of the fixed frame of reference by a known angle resulting from a rotation about a first axis of the first local frame of reference dependent on the roll (R) and a rotation dependent on the pitch (P) is defined; b/ the coordinates of each characteristic point ($P_1$, $P_2$) in said local frame of reference being equal, to within an unknown common factor, to the multiplying of a matrix defining said succession of rotations by a matrix of intrinsic image capture parameters and by the coordinates of a pixel corresponding to the characteristic point in an image captured from the craft, the values adopted by the quotients relating said coordinates are determined; c/ said coordinates of the characteristic points are expressed in said local frame of reference as a function of the distance between these characteristic points and of the quotients determined.

19 Claims, 4 Drawing Sheets

METHOD FOR DETERMINING, IN A FIXED 3D FRAME OF REFERENCE, THE LOCATION OF A MOVING CRAFT, AND ASSOCIATED COMPUTER PROGRAM AND DEVICE

The present invention relates to the field of the determination, in a 3D fixed frame of reference, of the location of a mobile machine provided with an image sensor associated with a first 3D local frame of reference, corresponding to the capture of an image, by said sensor, of the environment of the mobile machine comprising at least two characteristic points of said environment.

Certain of these flying machine, such as drones for example, are used to accomplish tasks of exploration, recognition, monitoring etc. To achieve all of these tasks, such a flying machine must be capable of ascertaining its location, especially in order to carry out hovering flights.

In numerous cases, it is not possible for the flying machine to resort to location of GPS type ("Global Positioning System"). It is therefore necessary to furnish it with a tool allowing it to carry out a hovering flight without GPS, by using measurements solely arising from inertial sensors and from image sensor(s). However, all the proposed approaches are based on filters, thus implying that initial location data must be provided. Now, an error in these initialization data can very significantly corrupt the estimated locations as a whole.

Furthermore, these approaches require a large number of characteristic points. A characteristic point is a point of the physical environment of the flying machine, which serves as frame in the images, and which is fixed (or else whose motion is known). Based on an image captured by the image sensor and comprising a characteristic point, the direction of this characteristic point is determined in a three-dimensional frame local to the flying machine.

The use of a large number of characteristic points generates a significant calculational load.

One of these known approaches uses the PTAM ("Parallel Tracking And Mapping") algorithm and an extended Kalman filter (cf. for example "Vision based navigation for micro helicopters", by Weiss, Stephan M., http://e-collection.library.ethz.ch/view/eth:5889).

The present invention is aimed at proposing a solution which contributes to solving these drawbacks of the prior art.

Indeed, the Applicant has discovered, unexpectedly, that once the pitch and roll values corresponding to an image have been determined in an absolute frame of reference (i.e. one whose position is not dependent on the motion of the flying machine), it is possible to determine the position of the flying machine and the yaw value corresponding to this image, in the absolute frame of reference, and to do so without taking into account the initialization values of position or of yaw.

For this purpose, according to a first aspect, the invention proposes a method of the aforementioned type characterized in that the angles of roll and of pitch of the mobile machine in the fixed frame of reference corresponding to said image capture having been determined in a previous step, the following steps are implemented, in relation to said captured image, so as to determine the angle of yaw and/or the coordinates of the mobile machine in the fixed frame of reference:

a/ a second local frame of reference is defined in respect of the mobile machine comprising an axis exhibiting a known deviation of angle from the yaw axis of the fixed frame of reference, said second local frame of reference resulting from the succession of two rotations, one of said rotations about a first axis of the first local frame of reference being dependent on the angle of roll determined and the other of said rotations being dependent on the angle of pitch determined;

b/ the coordinates of each of the two characteristic points in said second local frame of reference being equal, to within an unknown common factor, to the result of the multiplication of a matrix defining said succession of rotations, by a matrix of intrinsic parameters of the image sensor and by the coordinates of a pixel corresponding to said characteristic point on the image, the values taken by the quotients between said coordinates are determined so as to circumvent the unknown common factor;

c/ said coordinates of the two characteristic points in said second local frame of reference are thereafter expressed as a function of the distance between said characteristic points and of said determined values of quotients.

In embodiments, the method according to the invention furthermore comprises one or more of the following characteristics:

the coordinates, in the second local frame of reference, of the vector joining the two characteristic points are calculated, and according to which the angle of yaw of the mobile machine in the fixed frame of reference corresponding to said captured image is determined as a function of the arctan function applied to a variable dependent on said coordinates, in the local frame, of the vector joining the two characteristic points;

the coordinates of the mobile machine are calculated in the fixed frame of reference corresponding to said captured image, as a function of coordinates of at least one of said characteristic points and of said angle of yaw determined in the fixed frame of reference;

being given three characteristic points in the plane perpendicular to the yaw axis of the fixed frame of reference, the following steps are implemented in relation to said captured image:

for each of the three pairs of characteristic points, steps b/ and c/ are implemented and three values of angles of yaw are thus determined as a function of the roll and pitch values determined in the previous step;

on the basis of the three determined values of angles of yaw, a procedure for minimizing a function $\cos t(\xi) = (YW_{13} - YW_{12} - \gamma_1)^2 + (YW_{23} - YW_{12} - \gamma_2)^2$ is implemented in which the variables $YW_{13}$, $YW_{12}$ and $YW_{23}$ are non-linear functions of $\xi = \lfloor \text{Roll}, \text{Pitch} \rfloor^T$ where $\gamma_1$ and $\gamma_2$ represent two internal angles of the triangle of vertices of said characteristic points;

as a function of the roll and pitch values arising from this minimization procedure, steps b/ and c/ are implemented in relation to two of the characteristic points, and thus an angle of yaw in the fixed frame of reference is determined;

the method comprises a step of determining the angles $\gamma_1$ and $\gamma_2$, according to which we calculate:

$$\gamma_1 = \arccos\left(\frac{a^2 + b^2 - c^2}{2ab}\right) \text{ and } \gamma_2 = \pi - \arccos\left(\frac{a^2 + c^2 - b^2}{2ac}\right),$$

where $$a = \sqrt{(\mu_2 - \mu_1)^2 + (v_2 - v_1)^2} \quad b = \sqrt{(\mu_3 - \mu_1)^2 + (v_3 - v_1)^2}$$
$$c = \sqrt{(\mu_3 - \mu_2)^2 + (v_3 - v_2)^2},$$

the values $$\mu_i = \frac{x_i}{z_{i1}}$$

and $$v_i = \frac{y_i}{z_i},$$

where $$\begin{bmatrix} x_i \\ y_i \\ z_i \end{bmatrix}$$

are the coordinates of the characteristic point $P_i$ in the second local frame of reference, i=1 to 3, being determined on the basis of the following equalities:

$$\lambda \cdot \begin{bmatrix} x_i \\ y_i \\ z_i \end{bmatrix} = Rot \cdot A^{-1} \cdot \begin{bmatrix} u_i \\ v_i \\ 1 \end{bmatrix},$$

where $u_i$, $v_i$ are the coordinates of a pixel of the representation of the characteristic point $P_i$ in the image, A is a predetermined matrix of parameters intrinsic to the image sensor, $\lambda$·a factor of unknown value; and Rot is the matrix representing the succession of the two rotations;

said step of determining the angles $\gamma_1$ and $\gamma_2$ is implemented in a Kalman filter procedure observation phase;

the fixed frame of reference is defined such that the first characteristic point is the origin thereof, that the yaw axis is of direction contrary to the gravity vector and that the second characteristic point is of coordinate equal to zero on the pitch axis of the fixed frame of reference;

an axis of the second local frame of reference is chosen parallel to the yaw axis of the fixed frame of reference;

when the two characteristic points have one and the same coordinate value on the yaw axis of the fixed frame of reference, the coordinate value z of the location of the mobile machine on the yaw axis of the fixed frame of reference is:

$$z = \pm \frac{D}{\sqrt{\Delta \mu^2 + \Delta v^2}}$$

with $\Delta\mu=\mu_1-\mu_2$; $\Delta\mu=v_1-v_2$ and D the distance between the two characteristic points, $$\mu_1 = \frac{x_1}{z_1}, v_1 = \frac{y_1}{z_1}, \mu_2 = \frac{x_2}{z_2}$$

and $$v_2 = \frac{y_2}{z_2}$$

where $$\begin{bmatrix} x_1 \\ y_1 \\ z_1 \end{bmatrix}$$

and $$\begin{bmatrix} x_2 \\ y_2 \\ z_2 \end{bmatrix}$$

are the coordinates of the two characteristic points in the second local frame of reference;

when the two characteristic points do not have one and the same coordinate value on the yaw axis of the fixed frame of reference, the coordinate value z of the location of the mobile machine on the yaw axis of the fixed frame of reference is a solution of:

$$(\Delta\mu^2 + \Delta v^2)\left(\frac{z}{D}\right)^2 - 2(\Delta\mu\mu_2 + \Delta v v_2)\frac{\Delta z}{D}\frac{z}{D} + \left(\frac{\Delta z}{D}\right)^2 - 1 = 0$$

with $\Delta\mu=\mu_1-\mu_2$; $\Delta\mu=v_1-v_2$ and D the distance between the two characteristic points, $$\mu_1 = \frac{x_1}{z_1}, v_1 = \frac{y_1}{z_1}, \mu_2 = \frac{x_2}{z_2}$$

and $$v_2 = \frac{y_2}{z_2}$$

where $$\begin{bmatrix} x_1 \\ y_1 \\ z_1 \end{bmatrix}$$

and $$\begin{bmatrix} x_2 \\ y_2 \\ z_2 \end{bmatrix}$$

are the coordinates of the two characteristic points in the second local frame of reference;

the method comprises a step of determining the angle of yaw YW of the mobile machine in the fixed frame of reference with the aid of the following formula:

$$YW = -\theta = -2 \cdot \arctan \frac{-z(v_2 - v_1)}{\sqrt{(z(\mu_2 - \mu_1))^2 + (z(v_2 - v_1))^2} + (-z(\mu_2 - \mu_1))};$$

the method comprises at least one of steps i/ and ii/ hereinbelow, with $$-\theta = -2 \cdot \arctan \frac{-z(v_2 - v_1)}{\sqrt{(z(\mu_2 - \mu_1))^2 + (z(v_2 - v_1))^2} + (-z(\mu_2 - \mu_1))};$$

i/ a step of determining the coordinate x of the location of the mobile machine on the roll axis of the second fixed frame of reference ($R_n$) by calculating $x = \cos\theta \cdot z \cdot \mu_1 + \sin\theta \cdot z \cdot v_1$;

ii/ a step of determining the coordinate y of the mobile machine on the pitch axis (Y) of the fixed frame of reference by calculating $y = -\sin\theta \cdot z \cdot \mu_1 + \cos\theta \cdot z \cdot v_1$;

$$-\mu_1 = \frac{x_1}{z_1}, \; v_1 = \frac{y_1}{z_1}, \; \mu_2 = \frac{x_2}{z_2}$$

and $$v_2 = \frac{y_2}{z_2}$$

are calculated on the basis of the following equalities:

$$\lambda \cdot \begin{bmatrix} x_1 \\ y_1 \\ z_1 \end{bmatrix} = Rot \cdot A^{-1} \cdot \begin{bmatrix} u_1 \\ v_1 \\ 1 \end{bmatrix},$$

where $u_1$, $v_1$ are the coordinates of a pixel of the representation of one of the two characteristic points in the image;

$$\lambda \cdot \begin{bmatrix} x_2 \\ y_2 \\ z_2 \end{bmatrix} = Rot \cdot A^{-1} \cdot \begin{bmatrix} u_2 \\ v_2 \\ 1 \end{bmatrix},$$

where $u_2$, $v_2$ are the coordinates of a pixel of the representation of the other of the two characteristic points in the image, A is a predetermined matrix of parameters intrinsic to the image sensor (7), $\lambda$ a factor of unknown value; and Rot is the matrix representing the succession of the two rotations;

$$-\mu_1 = \frac{x_1}{z_1}, \; v_1 = \frac{y_1}{z_1}, \; \mu_2 = \frac{x_2}{z_2}$$

and $$v_2 = \frac{y_2}{z_2}$$

are calculated on the basis of the following equalities:

$$\lambda \cdot \begin{bmatrix} x_1 \\ y_1 \\ z_1 \end{bmatrix} = Rot \cdot A^{-1} \cdot \begin{bmatrix} u_1 \\ v_1 \\ 1 \end{bmatrix},$$

where $u_1$, $v_1$ are the coordinates of a pixel of the representation of one of the two characteristic points in the image;

$$\lambda \cdot \begin{bmatrix} x_2 \\ y_2 \\ z_2 \end{bmatrix} = Rot \cdot A^{-1} \cdot \begin{bmatrix} u_2 \\ v_2 \\ 1 \end{bmatrix},$$

where $u_2$, $v_2$ are the coordinates of a pixel of the representation of the other of the two characteristic points in the image, A is a predetermined matrix of parameters intrinsic to the image sensor (7), $\lambda$ a factor of unknown value; and Rot is the matrix representing the succession of the two rotations.

According to a second aspect, the present invention proposes a computer program for locating, in a 3D fixed frame of reference, a mobile machine provided with an image sensor associated with a first 3D local frame of reference corresponding to the capture of an image, by said sensor, of the environment of the mobile machine comprising at least two characteristic points of said environment, said program comprising instructions for implementing the steps of a method according to the first aspect of the invention during an execution of the program by processing means, the angles of roll and of pitch of the mobile machine in the fixed frame of reference corresponding to said image capture having been determined in a previous step.

According to a third aspect, the present invention proposes a device for determining, in a 3D fixed frame of reference, the location of a mobile machine provided with an image sensor associated with a first 3D local frame of reference corresponding to the capture of an image, by said sensor, of the environment of the mobile machine comprising at least two characteristic points of said environment, said determining device being adapted for previously determining the angles of roll and of pitch of the mobile machine in the fixed frame of reference corresponding to said image capture;

said determining device being characterized in that it is adapted for furthermore determining the angle of yaw and/or the coordinates of the mobile machine in the fixed frame of reference by defining a second local frame of reference in respect of the mobile machine comprising an axis exhibiting a known deviation of angle from the yaw axis of the fixed frame of reference, said second local frame of reference resulting from the succession of two rotations, one of said rotations about a first axis of the first local frame of reference being dependent on the angle of roll determined and the other of said rotations being dependent on the angle of pitch determined;

the coordinates of each of the two characteristic points in said second local frame of reference being equal, to within an unknown common factor, to the result of the multiplication of a matrix defining said succession of rotations, by a matrix of intrinsic parameters of the image sensor and by the coordinates of a pixel corresponding to said characteristic point on the image, said determining device being adapted for determining the values taken by the quotients between said coordinates in such a way as to circumvent the unknown common factor;

said determining device being adapted for thereafter expressing said coordinates of the two characteristic points in said second local frame of reference as a function of the distance between said characteristic points and of said determined values of quotients.

These characteristics and advantages of the invention will become apparent on reading the description which follows, given solely by way of example and with reference to the appended drawings in which.

Figure 1:
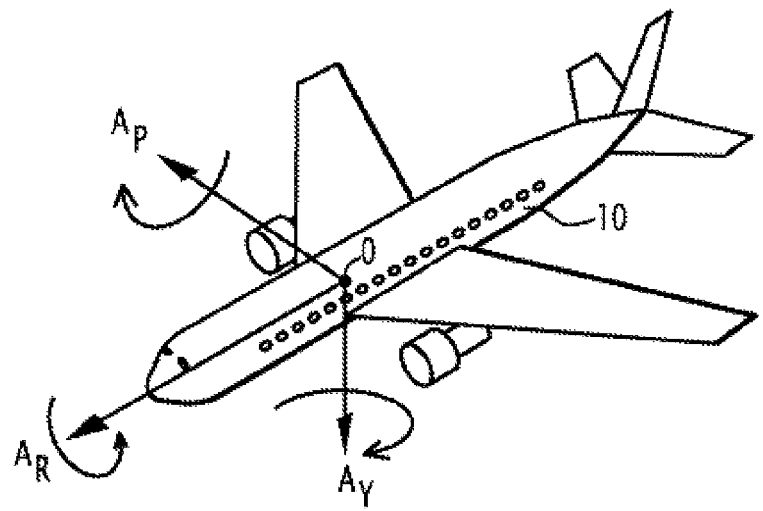
FIG. 1 represents a flying machine.

With reference to FIG. 1, the location of a flying machine 10 is generally characterized on the one hand by the determination of the position, in space, of its center of gravity O, and on the other hand by its attitude, that is to say by its rotations, measured with the aid of angles of rotation, with respect to three axes defining a three-dimensional frame passing through an origin point of the frame, for example the center of gravity O: the angle of roll with respect to a roll axis $A_R$, the angle of pitch with respect to a pitch axis $A_P$ and the angle of yaw with respect to a yaw axis $A_Y$.

In the case represented in FIG. 1, the roll axis $A_R$ considered is the longitudinal axis of the flying machine 10, the pitch axis $A_P$ is the transverse axis of the flying machine and the yaw axis $A_Y$ is the axis perpendicular to the axes $A_R$ and $A_P$.

Figure 2:
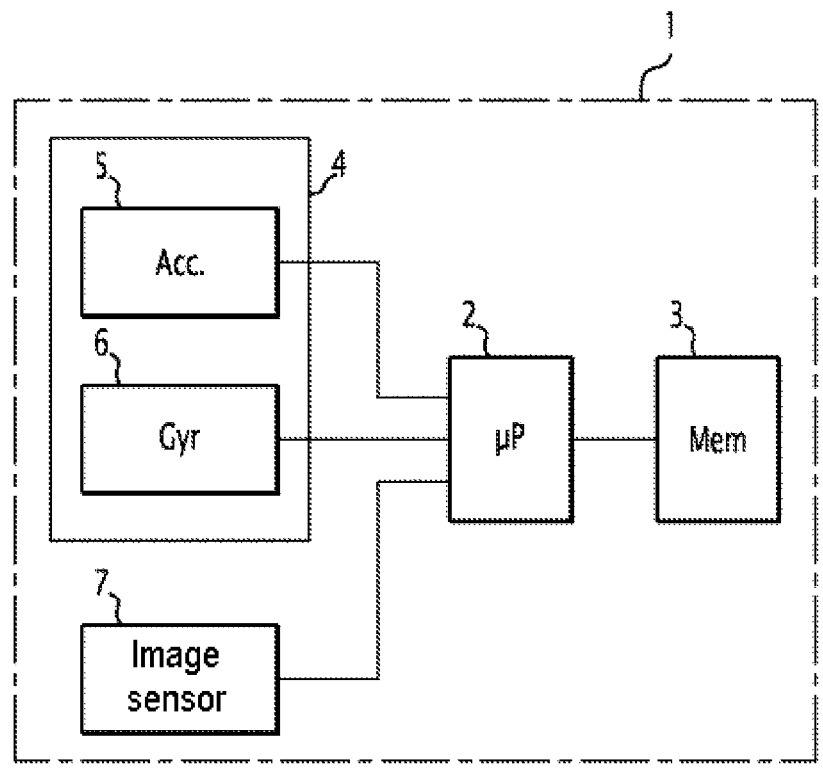
FIG. 2 represents a processing device in an embodiment of the invention.

In the embodiment considered of the invention, a flying machine 10, for example a drone, comprises a processing device 1, with reference to FIG. 2, adapted for performing measurements of inertial data and image captures and to process these data.

This processing device 1 comprises a microprocessor 2, a memory for storing data 3, a set 4 of inertial sensors and an image sensor 7.

In the embodiment considered, the set 4 of inertial sensors comprises an accelerometer module 5 with 3 mutually orthogonal accelerometers providing, every period of length $T_A$, the measurements of linear acceleration of the drone 10 in relation to three orthogonal axes ($X_I$, $Y_I$, $Z_I$) passing through a point $O_L$ of the drone and thus defining, with reference to FIG. 4, a frame $R_I=(O_L, X_I, Y_I, Z_I)$, local to the drone, and named hereinafter the local frame.

In the embodiment considered, the set 4 of inertial sensors furthermore comprises a gyroscope module 6 comprising three mutually orthogonal gyroscopes, which provide, every period of length $T_B$, measurements of rotation of the drone 10 about the axes ($X_I$, $Y_I$, $Z_I$).

The image sensor 7, for example a monocular camera, is fixed on the drone 10 in such a way as to capture an image of the environment of the drone 10 every period of length $T_I$. The captured images of the environment comprise especially a number N of characteristic points of the environment. In the present case, the axis $Z_I$ is the optical axis of the image sensor 7 and the point $O_L$ is the optical center of the image sensor 7.

In a known manner (cf. for example the Internet link http://opencv.willowgarage.com/documentation/camera_calibration_and_3d_reconstruction.html), the coordinates of a point in space can be retrieved, to within a scale factor, as a function of the coordinates of the pixel representing this point in an image captured by the image sensor 7, with the aid of a predetermined matrix A of parameters intrinsic to this image sensor and independent of the image.

Thus for a point M having coordinates ($x_l$, $y_l$, $z_l$) in the local frame $R_I$ and represented by a pixel with coordinates (u,v) on an image captured by the image sensor 7, we have:

$$\begin{bmatrix} u \\ v \\ 1 \end{bmatrix} = \lambda \cdot A \cdot \begin{bmatrix} x_l \\ y_l \\ z_l \end{bmatrix},$$

where $\lambda$ is a positive proportionality factor, independent of the image.

We therefore obtain the coordinates of a vector $$\begin{bmatrix} x_p \\ y_p \\ z_p \end{bmatrix},$$

proportional to $$\begin{bmatrix} x_l \\ y_l \\ z_l \end{bmatrix},$$

giving the direction of the point M from the origin $O_L$ of the frame $R_I$:

$$\begin{bmatrix} x_p \\ y_p \\ z_p \end{bmatrix} = \lambda \begin{bmatrix} x_l \\ y_l \\ z_l \end{bmatrix} = A^{-1} \cdot \begin{bmatrix} u \\ v \\ 1 \end{bmatrix} \quad (1)$$

with $$\frac{x_p}{z_p} = \frac{x_l}{z_l} \text{ and } \frac{y_p}{z_p} = \frac{y_l}{z_l}. \quad (2)$$

A characteristic point is for example an angle corner between two structures of the environment of the drone 10, the center of a ball, the center of a laser spot etc.

In one embodiment, $T_A=T_G=0.01$ seconds (s), and $T_I=0.1$ s.

In the memory 3 of the processing device 1, a program P of software instructions is stored, which, when it is executed by the microprocessor 2, is adapted for implementing the steps indicated hereinbelow with reference to FIG. 3.

In one embodiment considered hereinbelow, N is chosen at least equal to 2. Two characteristic points considered are named $P_1$ and $P_2$.

Figure 3:
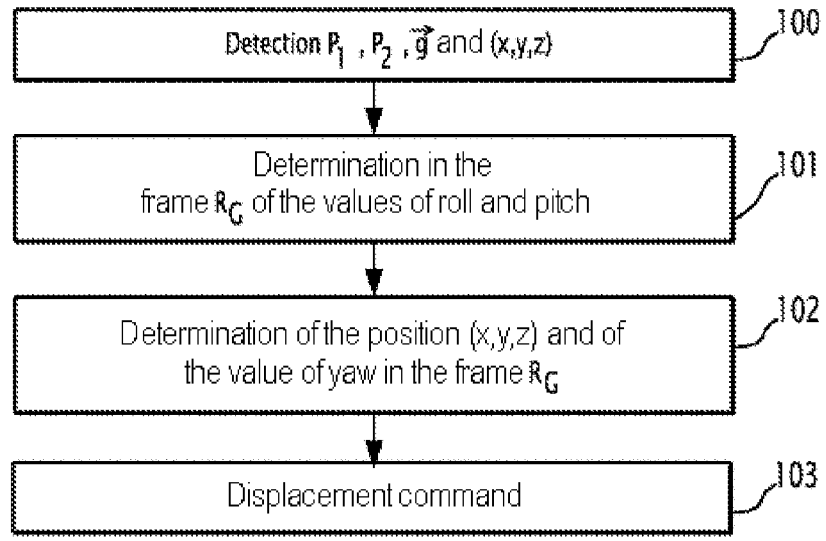
FIG. 3 is a flowchart of various steps implemented in an embodiment of the invention.
Figure 4:
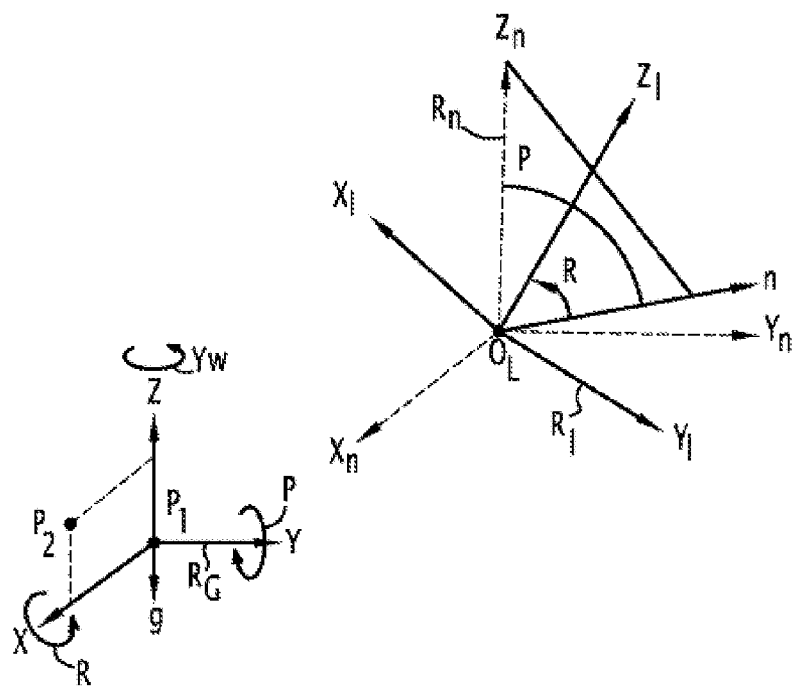
FIG. 4 represents points in three-dimensional frames used in an embodiment of the invention.

In a first step 100, with reference to FIGS. 3 and 4, and given these two characteristic points $P_1$, $P_2$, an absolute reference frame $R_G$ is defined.

In the embodiment considered, the characteristic point $P_1$ is the origin of this reference frame $R_G$, furthermore defined by three orthogonal axes X, Y and Z passing through $P_1$ and such that the axis Z is the axis parallel to the gravity vector g (such as determined by the accelerometer module 5) and of opposite direction, and the characteristic point $P_2$ is in the plane (X,Z), i.e. the characteristic point $P_2$ has a zero coordinate value on the axis Y.

The determination of at least the 6 values defining, in the absolute reference frame $R_G$, the position (x, y, z) of the point $O_L$ of the drone and the angles of roll R (relative to the axis X), pitch P (relative to the axis Y), yaw YW (relative to the axis Z) of the drone 10, is carried out in steps 101 and 102.

In step 101, these "absolute" values of roll R and of pitch P are determined, with respect to the roll axis taken equal to the axis X and to the pitch axis taken equal to the axis Y of the reference frame $R_G$.

Several solutions can be implemented for this step 101. Two of them will be explained further on.

Two characteristic points minimum are necessary in order to carry out step 102, i.e. to determine the angle of yaw and the position with respect to the absolute frame $R_G$.

When more than two characteristic points are available, the same number of images is required as in the case of two characteristic points, but the accuracy in the estimated angle values is higher.

We now consider an image captured by the image sensor 7 and we associate therewith a value of roll R and a value of pitch T of the drone corresponding to the instant of the capture of this image (by taking directly the values determined in step 101 for this image or by averaging several values of roll, respectively pitch, determined for several images captured in a given time span dependent on the instant of the capture of this image considered etc.).

In step 102, the yaw value YW and the position (x,y,z) of the drone 10 in the absolute frame $R_G$ are determined.

As indicated above, the image considered comprises a representation of each characteristic point $P_1$ and $P_2$, thereby making it possible to determine the position of these points (by means of a scale factor) in the local frame $R_I$ (cf. especially equations (1) and (2)).

The knowledge of the absolute values of roll and pitch, R and P, makes it possible to define a new local frame $R_n$ and to express the position of the characteristic points in this new local frame $R_n$.

Figure 6:
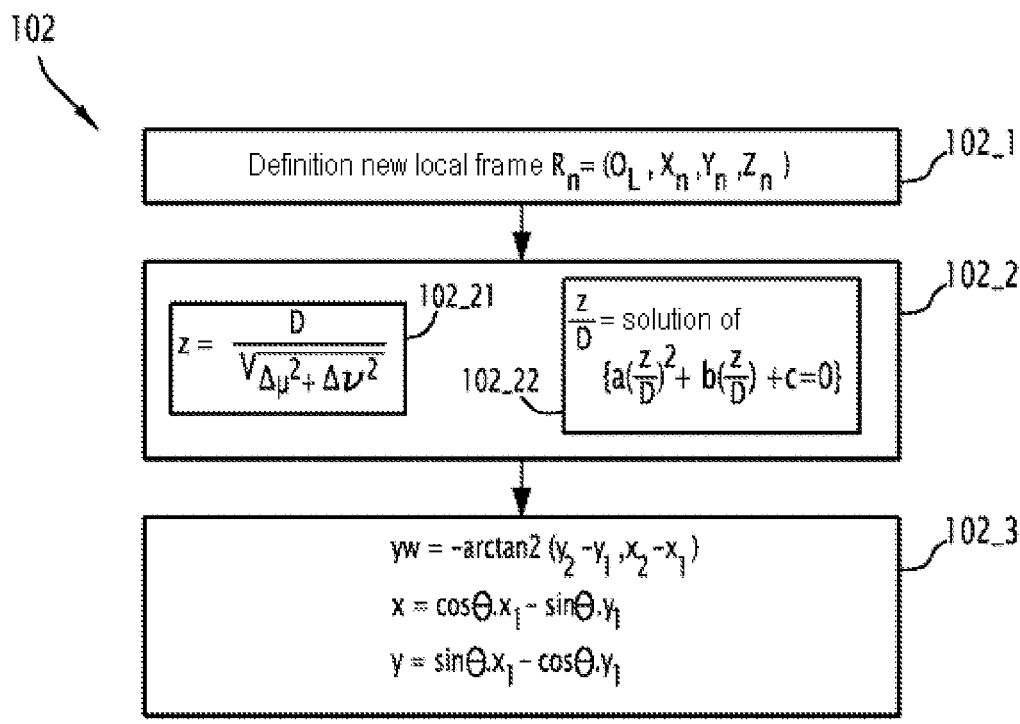
FIG. 6 is a flowchart of various steps implemented in an embodiment of the invention.

Thus, with reference to FIG. 6, in a step 102_1, we define this new local frame $R_n = (O_L, X_n, Y_n, Z_n)$, the origin of which is the point $O_L$ and which comprises 3 orthogonal axes $X_n, Y_n, Z_n$. It is represented dashed in FIG. 4.

The axis $Z_n$ is defined in such a way that it has the same orientation as the axis Z of the general frame $R_G$.

The axis n represents the projection of the axis $Z_n$ on the plane $(Y_I, Z_I)$. The angle of pitch P is the angle between the axis $Z_n$ and the axis n, and the angle of roll R is the angle between the axis n and the axis $Z_I$.

The aim is to determine the coordinates $$\begin{bmatrix} x \\ y \\ z \end{bmatrix}$$

of the point $O_L$ in the absolute frame $R_G$, as well as the angle YW of the axis $X_n$ with respect to the axis X (YW being the value of the angle of yaw in the absolute frame $R_G$).

We call $$\begin{bmatrix} x_1 \\ y_1 \\ z_1 \end{bmatrix}$$

the coordinates of the characteristic point $P_1$, and $$\begin{bmatrix} x_2 \\ y_2 \\ z_2 \end{bmatrix}$$

those of the characteristic point $P_2$, in the new local frame $R_n$. We write $$\mu_1 = \frac{x_1}{z_1}, v_1 = \frac{y_1}{z_1}, \mu_2 = \frac{x_2}{z_2}$$

and $$v_2 = \frac{y_2}{z_2}.$$

With the aid of equation (1), on the basis of the image considered, and as a function furthermore of a rotation matrix, named Rot, defining the rotation operation making it possible on the basis of the local frame $R_I$ to obtain the new local frame $R_n$, we have:

$$\lambda \cdot \begin{bmatrix} x_1 \\ y_1 \\ z_1 \end{bmatrix} = Rot \cdot A^{-1} \cdot \begin{bmatrix} u_1 \\ v_1 \\ 1 \end{bmatrix},$$

where $u_1, v_1$ are the coordinates of the pixel on which the representation of the point $P_1$ in the image is centered; and $$\lambda \cdot \begin{bmatrix} x_2 \\ y_2 \\ z_2 \end{bmatrix} = Rot \cdot A^{-1} \cdot \begin{bmatrix} u_2 \\ v_2 \\ 1 \end{bmatrix},$$

where $u_2, v_2$ are the coordinates of the pixel on which the representation of the point $P_2$ in the image is centered; and $$Rot = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

where:
$\alpha$ is the angle of rotation performed about the axis $Z_I$ corresponding to the yaw and fixed at 0, $\beta$ is the angle of rotation performed about the axis $Y_I$ and corresponding to the pitch and $\gamma$ is the angle of rotation performed about the axis $X_I$ corresponding to the roll, to transform the frame $R_I$ into the frame $R_n$.

The matrix Rot is obtained with the aid of a first rotation of an angle value $\gamma$ about the axis $X_I$, followed by a second rotation, of the angle value 13 about the axis $Y_I$, and finally of a third rotation, of the angle value a about the axis $Z_I$ (therefore $\beta=P$ and $\gamma=R$, both calculated in step 101).

To obtain the frame $R_n$, only the first two rotations have to be carried out. Stated otherwise, the two frames $R_n$ and $R_I$ have the same yaw value (unknown). This amounts to fixing the value of $\alpha$ at 0 in the matrix Rot (for more information on this rotation matrix, cf. for example http://planning.cs.uiuc.edu/node102.html).

By calculating $$Rot \cdot A^{-1} \cdot \begin{bmatrix} u_1 \\ v_1 \\ 1 \end{bmatrix}$$

and $$Rot \cdot A^{-1} \cdot \begin{bmatrix} u_2 \\ v_2 \\ 1 \end{bmatrix},$$

we deduce therefrom the values of $$\mu_1 = \frac{x_1}{z_1}, v_1 = \frac{y_1}{z_1}, \mu_2 = \frac{x_2}{z_2}$$

and $$v_2 = \frac{y_2}{z_2}.$$

We seek to determine the coordinates $$\begin{bmatrix} x \\ y \\ z \end{bmatrix}$$

of the point $O_L$ in the absolute frame $R_G$, as well as the angle of yaw YW with respect to the axis Z of this frame $R_G$.

In a step 102_2, the value of z is determined.

Case 1: $P_1$, $P_2$ are both in the plane (X, Y).

In a step 102_21, which is implemented when the characteristic points both belong to the plane (X,Y), i.e. have the same coordinate on the axis Z of the absolute frame $R_G$, we determine the value of the coordinate z of the point $O_L$ on the axis X, with $z_1=z_2=-z$:

With $$P_1 = -z \cdot \begin{bmatrix} \mu_1 \\ v_1 \\ 1 \end{bmatrix}$$

and $$P_2 = -z \cdot \begin{bmatrix} \mu_2 \\ v_2 \\ 1 \end{bmatrix}$$

and calling D the distance separating $P_1$ from $P_2$, it follows that $$z = \pm \frac{D}{\sqrt{\Delta\mu^2 + \Delta v^2}};$$

$\Delta\mu=\mu_1-\mu_2; \Delta v=v_1-v_2$.

Stated otherwise, z is expressed as a function of D, to within the sign.

The sign of z is determined thereafter. Indeed, the sign of the coordinate on the axis $Z_I$ of the characteristic points $P_1$, $P_2$ is positive (otherwise they would not be on the image). From this we deduce the sign of the coordinate ($-z$) of the characteristic points $P_1$, $P_2$ on the axis $Z_n$ or Z (the matrix Rot depending on the values, known, of roll and pitch).

From this we deduce $x_1=z \cdot \mu_1$, $y_1=z \cdot v_1$, $x_2=z \cdot \mu_2$ and $y_2=z \cdot v_2$.

Figure 5:
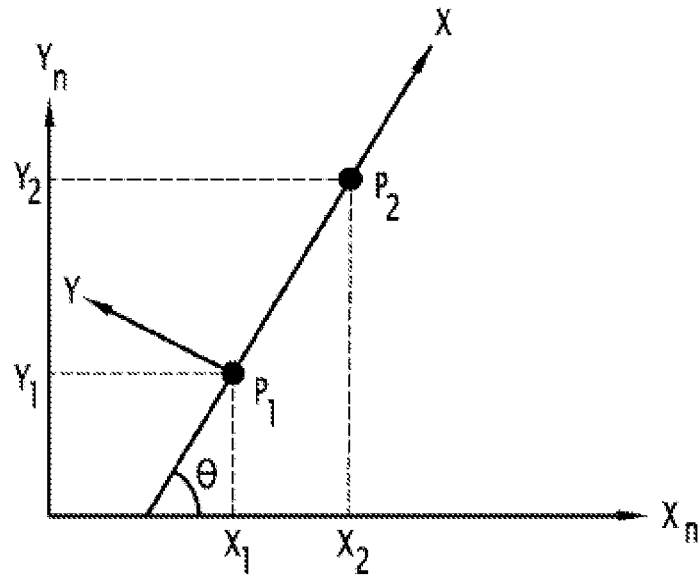
FIG. 5 is a view of two characteristic points in a plane ($X_n$, $V_n$) in an embodiment of the invention.

With reference to FIG. 5, in a step 102_3, we deduce therefrom the value of the yaw YW in the absolute frame $R_G$ with the aid of the arctan 2 function:

$$YW = -\theta = -\arctan2(y_2 - y_1, x_2 - x_1) = \quad (4)$$
$$-2 \cdot \arctan\frac{y_2 - y_1}{\sqrt{(x_2-x_1)^2 + (y_2-y_1)^2} + (x_2-x_1)}$$

From FIG. 5 we deduce furthermore the coordinates x and y of the origin $O_L$ of the local frames $R_I$ and $R_n$ in the global frame $R_G$:

$$x=-\cos\theta \cdot x_1 - \sin\theta \cdot y_1 \quad (5)$$

$$y=\sin\theta \cdot x_1 - \cos\theta \cdot y_1 \quad (6)$$

The coordinates $$\begin{bmatrix} x \\ y \\ z \end{bmatrix}$$

of $O_L$ representing the position of the drone in the absolute frame $R_G$ are thus determined, as is also the angle of yaw YW sought with respect to this absolute frame.

They are expressed as a function of the distance D. The coordinates of this position depend proportionately on D.

Case 2: $P_2$ is not in the Plane (X, Y)

Then $z_2 \neq z_1$ and $z_1=-z$ and $z_2=-z+\Delta z$, with $\Delta z \neq 0$. In a step 102_22, which is implemented when the characteristic points do not both belong to the same plane (X,Y), i.e. have the same coordinate on the axis Z of the general frame $R_G$, the coordinates of $P_1$ and $P_2$ are expressed in the following manner this time with a view to determining the value of the coordinate z of the point $O_L$ on the axis X:

$$P_1 = -z \cdot \begin{bmatrix} \mu_1 \\ v_1 \\ 1 \end{bmatrix}$$

and $$P_2 = (-z \cdot \Delta z) \cdot \begin{bmatrix} \mu_2 \\ v_2 \\ 1 \end{bmatrix}$$

and D being the distance separating $P_1$ from $P_2$ and $\Delta\mu = \mu_1 - \mu_2; \Delta v = v_1 - v_2$, we obtain the second-order polynomial equation in z:

$$(\Delta\mu^2 + \Delta v^2)\left(\frac{z}{D}\right)^2 - 2(\Delta\mu\mu_2 + \Delta v v_2)\frac{\Delta z}{D}\frac{z}{D} + \left(\frac{\Delta z}{D}\right)^2 - 1 = 0$$

If the ratio $$\frac{\Delta z}{D}$$

is known, the above equation can be used to determine $$\frac{z}{D}.$$

It provides two solutions. In the same manner as in case 1, one of these solutions is eliminated because the sign of $z_1$, $z_2$ is positive.

Stated otherwise, z is expressed as a function of D, to within the sign.

From this we deduce $x_1 = -z \cdot \mu_1$, $y_1 = -z \cdot v_1$, $$x_2 = z\left(-1 + \frac{\Delta z}{D}\right) \cdot \mu_2$$

and $$y_2 = -z\left(-1 + \frac{\Delta z}{D}\right) \cdot v_2.$$

Next, step 102_3 is implemented as in case 1 and the value of the yaw YW in the absolute frame $R_G$ is deduced with the aid of the arctan 2 function:

$$YW = -\theta = -\arctan 2(y_2 - y_1, x_2 - x_1) = \qquad (4)$$
$$-2 \cdot \arctan\frac{y_2 - y_1}{\sqrt{(x_2 - x_1)^2 + (y_2 - y_1)^2} + (x_2 - x_1)}$$

From FIG. 5, we furthermore deduce the coordinates x and y of $O_L$ in the absolute frame $R_G$:

$$x = -\cos\theta \cdot x_1 - \sin\theta \cdot y_1 \qquad (5)$$

$$y = \sin\theta \cdot x_1 - \cos\theta \cdot y_1 \qquad (6)$$

The coordinates $$\begin{bmatrix} x \\ y \\ z \end{bmatrix}$$

of $O_L$ representing the position of the drone in the absolute frame $R_G$ are thus determined, as is also the angle of yaw with respect to this absolute frame.

They are expressed as a function of the distance D. The coordinates of this position depend proportionately on D.

Thus, according to the invention, the values of position (x, y, z) and of yaw of the drone are determinable according to the invention in an absolute frame with the aid of two characteristic points alone and of an image for which the roll and pitch values have been determined previously, without needing any initialization position values or any initialization yaw value, and with a reduced number of calculations, allowing autonomous missions of the drone.

In a step 103, optional, once the position of the drone and the angles of pitch, roll and yaw have been determined in the absolute frame $R_G$, processings and/or actions are carried out as a function of these elements.

In one embodiment, the value of D can be estimated, for example by integrating data of images provided by the image sensor 7 and as a function of the inertial data provided by the accelerometer module 5 and the gyroscope module 6 and obtained when the drone moves with a non-zero acceleration, before switching to hovering flight (cf. especially the document mentioned above A. Martinelli, Vision and IMU Data Fusion: Closed-Form Solutions for Attitude, Speed, Absolute Scale and Bias Determination, Transaction on Robotics, Volume 28 (2012), Issue 1 (February), pp. 44-60).

It will be noted that even if the value of D is obtained with a non-negligible error (for example of 10%), this error will not affect the hovering flight performance. Indeed, the solution described provides the position as a linear function of D. Therefore the error in D will systematically affect the position. This would be different if the solution determined the position with a statistical error of amplitude 10%. It would then be impossible to stabilize the drone since at each calculation stage, the estimated current position would differ significantly from the previous. According to the solution described, the difference between successive position estimations is independent of the error in the estimation of D.

An error in the estimations of the roll and pitch values performed in step 101 affects in a linear manner the estimations of the position and of the yaw such as were described hereinabove with reference to step 102.

In one embodiment, to reduce the impact of an error in estimating the roll and pitch values on the estimations of the position and of the yaw, step 102 is replaced with a step 102*b* is, in which three characteristic points $P_1$, $P_2$ and $P_3$ at least appearing on the image considered and forming part of the plane (X,Y) are taken into account, instead of the two characteristic points $P_1$, $P_2$ considered in step 102.

Figure 7:
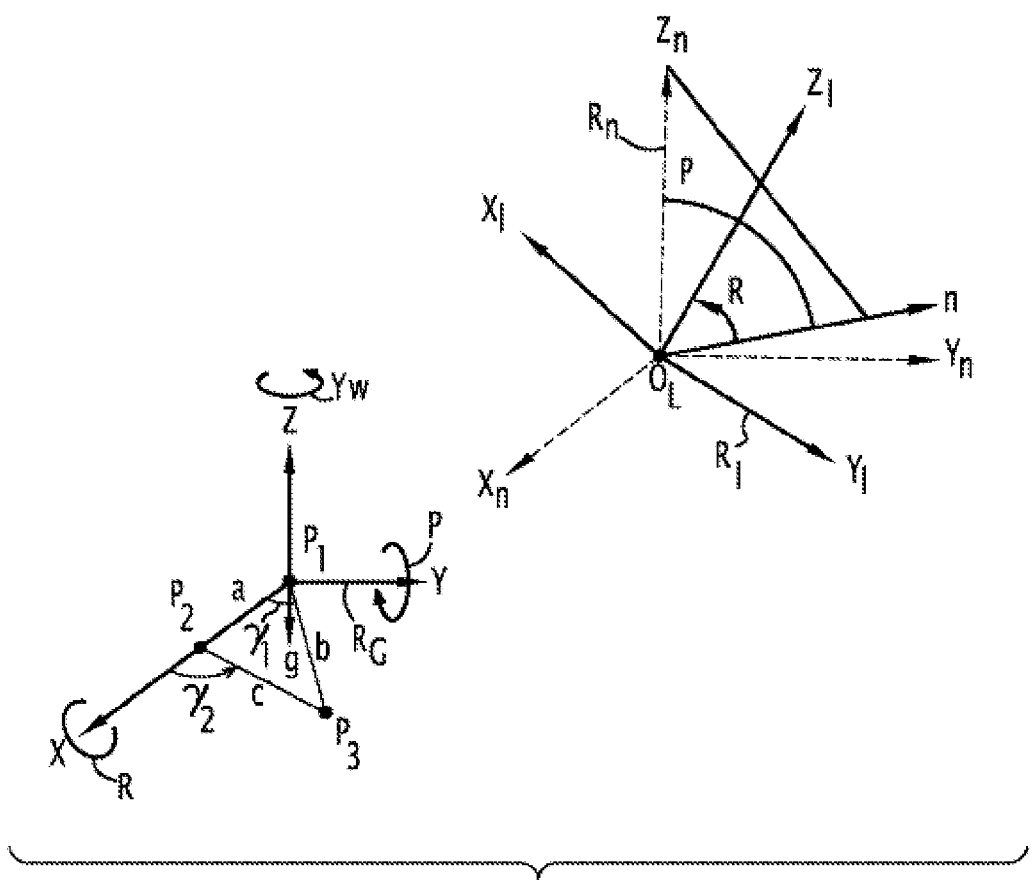
FIG. 7 represents points in three-dimensional frames used in an embodiment of the invention.

In FIG. 7, the three characteristic points $P_1$, $P_2$ and $P_3$ are represented. These points $P_1$, $P_2$ and $P_3$ are coplanar, in the plane (X,Y) of the frame $R_G$. They form a triangle.

It is considered that the internal angles of this triangle are known, this corresponding to knowing the angles $\gamma_1$ and $\gamma_2$ represented in FIG. 7. If this is not the case, a step of previous estimation of these angles will have to be carried out, as described further on.

In step 102b is, these operations described hereinabove in step 102 are implemented in relation to the frames of reference $R_G$, $R_n$, $R_I$, by considering firstly the two points $P_1$, $P_2$, both in the plane (X,Y), secondly by considering the two points $P_1$, $P_3$, both in the plane (X,Y), and thirdly by considering the two points $P_2$, $P_3$, both in the plane (X,Y), as detailed hereinbelow Let $$\begin{bmatrix} x_i \\ y_i \\ z_i \end{bmatrix}$$

be the coordinates of the characteristic point $P_i$, i=1 to 3, in the new local frame $R_n$ and $$\mu_i = \frac{x_i}{z_i}, v_i = \frac{y_i}{z_i}.$$

Firstly, by implementing step 102 by considering the characteristic points $P_1$, $P_2$, we obtain the value of the coordinate z of the point $O_L$ and a first yaw estimation $YW_{12}$ (corresponding to the value of the rotation of the drone about the axis Z with respect to the axis $X=(P_1P_2)$):

$$YW_{12} = -\arctan 2(y_2 - y_1, x_2 - x_1)$$

and $$z = \pm \frac{D}{\sqrt{(\mu_1 - \mu_2)^2 + (v_1 - v_2)^2}};$$

calling D the distance separating $P_1$ from $P_2$.

As seen in the description of step 102, the sign of z and the values of $\mu_i$ and $v_i$, i=1 to 3 are provided by the data of the image sensor 7.

Secondly, by implementing step 102 by considering the characteristic points $P_1$, $P_3$, we obtain a second yaw estimation $YW_{13}$ for the image considered (corresponding to the value of the rotation of the drone about the axis Z with respect to the axis $(P_1P_3)$):

$$YW_{13} = -\arctan 2(y_3 - y_1, x_3 - x_1).$$

Thirdly, by implementing step 102 by considering the characteristic points $P_2$, $P_3$, we obtain a third yaw estimation $YW_{23}$ for the image considered (corresponding to the value of the rotation of the drone about the axis Z with respect to the axis $(P_2P_3)$):

$$YW_{23} = -\arctan 2(y_3 - y_2, x_3 - x_2).$$

As FIG. 7 shows, the three calculated angles of yaw $YW_{12}$, $YW_{13}$, $YW_{23}$ are furthermore related by the following equations:

$$YW_{13} = YW_{12} + \gamma_1$$

$$YW_{23} = YW_{12} + \gamma_2.$$

From this we deduce that:

$$\gamma_1 = YW_{13} - YW_{12}$$

$$\gamma_2 = YW_{23} - YW_{12}.$$

As the angles $\gamma_1$ and $\gamma_2$ are known, for example $$\gamma_1 = \frac{\pi}{3}$$

and $$\gamma_2 = \frac{2\pi}{3},$$

the sought-after estimation of the angle of yaw, i.e. $YW = YW_{12}$, can be corrected, taking this constraint into account.

This can be taken into account by defining a cost function, named cost, and by then seeking to minimize the cost function, for example with the aid of the Levenberg-Marquardt procedure.

For example, the cost function is defined with the aid of a non-linear least squares procedure. In one embodiment, the function cost, defined as the quadratic difference between the expected values (dependent on the modeled parameters) and the known values, is defined thus:

$$\cos t(\xi) = (YW_{13} - YW_{12} - \gamma_1)^2 + (YW_{23} - YW_{12} - \gamma_2)^2,$$

in which the variables $YW_{ij}$ are non-linear functions of $\xi = [\text{Roll}, \text{Pitch}]^T$].

Once the angles of Roll and Pitch which minimize the cost function cost have been determined, which are therefore the corrected angles of roll and pitch, the corrected angle of yaw YW, and then the coordinates x y and z of $O_L$ are calculated as a function of this corrected angle of yaw YW, on the basis of equations (5) and (6) detailed hereinabove with reference to step 102.

If the internal angles of the triangle $(P_1, P_2, P_3)$ are not known, a step of previous estimation of the angles $\gamma_1$ and $\gamma_2$ must be implemented, for example with the aid of a Kalman filter as described hereinbelow.

The state to be estimated is $\Gamma = (\gamma_1, \gamma_2)^T$.

Initialization values are chosen for the angles $\gamma_1$ and $\gamma_2$ (for example those indicated above $$\gamma_1 = \frac{\pi}{3}$$

and $$\gamma_2 = \frac{2\pi}{3}),$$

and for the initial covariance matrix $P_{tri}$ (for example, the initial value for $P_{tri}$ is $$\sigma_{pt}^2 \begin{bmatrix} 1 & 0 \\ 0 & 1 \end{bmatrix},$$

with the value $\sigma_{pt}$ being equal to the uncertainty in radians in the knowledge of the angle values $\gamma_1$ and $\gamma_2$.

During the prediction phase, the Kalman filter does not update the state $\Gamma$, or the covariance matrix, since the angles $\gamma_1$ and $\gamma_2$ are constant over time.

During the observation phase, the roll and pitch values estimated in step 101, and the images, are used. Knowing the estimated roll and pitch values, a rotation of the local frame $R_I$ into the new local frame $R_n$ can be carried out, with an error due to the estimation of these angles of roll and pitch, with the aid of the matrix Rot.

The coordinates $$\begin{bmatrix} x_i \\ y_i \\ z_i \end{bmatrix}$$

of the characteristic points $P_i$, i=1 to 3 in the new local frame $R_n$, are such that:

$$\begin{bmatrix} x_i \\ y_i \\ z \end{bmatrix} = z \begin{bmatrix} \mu_i \\ v_i \\ 1 \end{bmatrix}.$$

The image data and the matrices Rot and A provide the values of $\mu_i$ and $v_i$, as seen previously, i=1 to 3.

It is therefore possible thereafter to calculate the lengths a, b, c of the sides of the triangle $(P_1, P_2, P_3)$ where $a=\|P_1P_2\|$, $b=\|P_1P_3\|$ and $c=\|P_2P_3\|$:

$$a = z\sqrt{(\mu_2-\mu_1)^2+(v_2-v_1)^2}$$

$$b = z\sqrt{(\mu_3-\mu_1)^2+(v_3-v_1)^2}$$

$$c = z\sqrt{(\mu_3-\mu_2)^2+(v_3-v_2)^2}$$

Applying the cosine rule:

$$c^2 = a^2 + b^2 - 2ab\cos\gamma_1$$

and $$b^2 = a^2 + c^2 - 2ac\cos(\pi-\gamma_2).$$

The value of the angles $\gamma_1$ and $\gamma_2$ can thus be calculated with the aid of the following formulae:

$$\gamma_1 = \arccos\left(\frac{a^2+b^2-c^2}{2ab}\right) \text{ and } \gamma_2 = \pi - \arccos\left(\frac{a^2+c^2-b^2}{2ac}\right).$$

It will be noted that the values of these angles $\gamma_1$ and $\gamma_2$ are calculated independently of z. It is then possible to use the calculated values of $\gamma_1$ and $\gamma_2$ as direct observation of the state F of the Kalman filter to correct the previous value of $\Gamma$. The estimation of the values of the angles thus converges toward the effective values $\gamma_1$ and $\gamma_2$.

In the embodiments described hereinabove, the local frame considered is that of the image sensor 7. Other local frames may be selected, equation (1) giving the correspondence between the coordinates of a pixel in an image and the coordinates in the local frame which then have to be adapted accordingly in a known manner (cf. http://opencv.willowgarage.com/documentation/camera_calibration_and_3d_reconstruction.html)

The invention has been described with reference to a drone hereinabove, but it can of course be implemented for any type of machine, especially flying machine, whose location must be determined.

Moreover, as indicated above, step 101 can be implemented in diverse ways.

For example, a sub-step of estimating the gravity vector in the local frame $R_I$ is implemented We call G the gravity vector, $$G = g\begin{bmatrix} \sin P \\ -\sin R \cos P \\ -\cos R \cos P \end{bmatrix} = \begin{bmatrix} G_x \\ G_y \\ G_z \end{bmatrix}$$

in the frame $R_I$, where g≈9.8 ms$^{-2}$ is the amplitude of the gravity, P the angle of pitch and R the angle of roll.

When the components $G_x$, $G_y$ and $G_z$ of the vector G are known, the values P and R are deduced therefrom:

$$P = \arcsin\frac{G_x}{g}$$

and R=arctan 2($G_y,G_z$) if cos P<0 and R=arctan 2($G_y,G_z$)+π if cos P>0.

Thus, the step of estimating the values of roll R and pitch P amounts here to estimating the gravity in the local frame $R_I$.

Two cases are distinguished: a case where the inertial acceleration is negligible with respect to the gravitational acceleration, and a case where the inertial acceleration is not negligible with respect to the gravitational acceleration.

In the case where the inertial acceleration is negligible with respect to the gravitational acceleration, this frequently being the case, the components employed for the vector G are those provided directly by the accelerometer module 5. They are furthermore optionally filtered with the aid of an extended Kalman filter (EKF). In this filtering, in a prediction phase, the estimated gravity vector undergoes a rotation by using the data of the gyroscope module 6, and then an observation phase is implemented by using the acceleration provided by the accelerometer module 5, which coincides with gravity since the inertial acceleration is assumed negligible.

In the case where the inertial acceleration is not negligible with respect to the gravitational acceleration, the components employed for the vector G are calculated as detailed in the document A. Martinelli, "Vision and IMU Data Fusion: Closed-Form Solutions for Attitude, Speed, Absolute Scale and Bias Determination", Transaction on Robotics, Volume 28 (2012), Issue 1 (February), pp. 44-60 and recalled hereinbelow. This procedure makes it possible to determine several physical quantities by collecting data delivered by the set of inertial sensors 4 and by the image sensor 7 over a short time interval [$T_{in}$, $T_{end}$] and makes it possible to express the value of these physical quantities at the time $T_{in}$ solely as a function of the inertial data and data of images obtained during the interval [$T_{in}$, $T_{end}$].

Among these physical quantities feature the three components of the gravity vector in the local frame $R_I$, i.e. the components $G_x$, $G_y$ and $G_z$ of G.

We consider the absolute frame $R_G$ defined hereinabove in step 100 (it will be noted, however, that any frame (x, y, z) whose z axis points vertically upwards (i.e. is parallel, and is opposite, to the gravity vector) can be considered for determining the values of roll and pitch in the mode of implementation described here of step 101).

Bold lower-case letters will be used hereinafter to identify the vectors in this frame $R_G$ (for example, the gravity vector will be labeled by g, with $g=[0,0,-g]^T$ where g is the norm of the gravity vector). It is assumed here that the frame of the set of inertial sensors 4 and that of the image sensor 7 are mutually coincident, and forms the so-called local frame $R_I$. Bold upper-case letters will be used hereinafter to identify the vectors in this frame $R_I$. As the local frame R, is time-dependent, the following notation is adopted: the vector $W_t(\tau)$ whose coordinates vary as a function of time represented by the variable $\tau$ is, in the local frame in its state considered at an instant t, the vector of absolute coordinates $w(\tau)$. Furthermore, we denote by $C_{t_1}^{t_2}$ the matrix which characterizes the rotation, occurring in the time interval $[t_1, t_2]$, of the local frame $R_I$. We then have: $W_{t_1}(\tau) = C_{t_1}^{t_2} W_{t_2}(\tau)$ and $(C_{t_1}^{t_2})^{-1} = C_{t_2}^{t_1}$.

Finally $C^t$ represents the rotation matrix for passing between the absolute frame $R_G$ and the local frame $R_I$ at the time t, i.e. $w(\tau) = C^t W_t(\tau)$.

The set of inertial sensors 4 provides acceleration data, i.e. the acceleration vector A, and data regarding the angular speed of the drone 10. The accelerometer module 5 measures not only the inertial acceleration, i.e. the vector $A^{inertial}$, but also the gravitational acceleration, i.e. the vector G.

It is assumed that the images of the image sensor 7 comprise the representations of a characteristic point, for example $P_1$, or of several characteristic points during the interval $[T_{in}, T_{end}]$ as represented in FIG. 4.

The position r of the drone at an instant $t \in [T_{in}, T_{end}]$ satisfies the following equation:

$$r(t) = r(T_{in}) + v(T_{in})\Delta t + \int_{T_{in}}^{t}\int_{T_{in}}^{\tau} a(\xi) d\xi d\tau \quad (10)$$

where $v \equiv dr/dt$, $a \equiv dv/dt$ and $\Delta t = t - T_{in}$. The accelerometer module 5 does not provide the acceleration vector $a(\xi)$, but it provides the acceleration in the local frame which also comprises the gravitational acceleration component. More particularly, the accelerometer module 5 provides $A_\xi(\xi) \equiv A_\xi^{inertial}(\xi) - G_\xi$. It will be noted that the gravity is deducted since, when the drone 10 is not accelerating (i.e. $A_\xi^{inertial}(\xi)$ is zero), the accelerometer module 5 detects an acceleration which is that of an object accelerated upwards in the absence of gravity. It will also be noted that the vector $G_\xi$ depends on the time only because the local frame can rotate.

Equation (10) is rewritten with the aid of the vector $A_\xi(\xi)$ provided by the accelerometer module 5:

$$r(t) = r(T_{in}) + v(T_{in})\Delta t + g\frac{\Delta t^2}{2} + C^{T_{in}} S_{T_{in}}(t),$$

where $$S_{T_{in}}(t) \equiv \int_{T_{in}}^{t}\int_{T_{in}}^{\tau} C_{T_{in}}^{\xi} A_\xi(\xi) d\xi d\tau.$$

The matrix $C_{T_{in}}^{\xi}$ can be obtained as a function of the angular speed of the drone 10, during the interval $[T_{in}, \xi]$, such as provided by the gyroscope module 6 (cf. J. A. Farrell, "Aided Navigation: GPS and High Rate Sensors", McGraw-Hill, 2008). And the vector $S_{T_{in}}(t)$ can be obtained by integration of the data provided by the gyroscope module 6 and the accelerometer module 5 during the interval $[T_{in}, t]$.

Let us assume that N characteristic points $P_i$, i=1 to N, are observed simultaneously. According to the notation convention employed, the position of the characteristic point $P_i$ in the absolute frame is represented by the vector $p^i$, i=1 to N and the position of the characteristic point $P_i$ at the time t, in the local frame considered at the time t, is represented by the vector $P^i_t(t)$, i=1 to N.

We have: $p^i = r(t) + C^{T_{in}} C_{T_{in}}^{t} P^i_t(t)$, and by using equation (10), we obtain the following equation, for i=1 to N:

$$P^i_t(t) = C_t^{T_{in}}\left[P^i_{T_{in}}(T_{in}) - V_{T_{in}}(T_{in})\Delta t - G_{T_{in}}\frac{\Delta t^2}{2} - S_{T_{in}}(t)\right] \quad (11)$$

A single image captured at the time t provides all the vectors $P^i_t(t)$ to within a scale factor. As the data provided by the gyroscope module 6 during the interval $[T_{in}, T_{end}]$ make it possible to construct the matrix $C_t^{T_{in}}$, obtaining the vectors $P^i_t(t)$ to within a scale factor makes it possible to also determine $P^i_{T_{in}}(t) = C_{T_{in}}^{t} P^i_t(t)$ to within a scale factor.

From equation 11, we deduce, for i=1 to N:

$$P^i_{T_{in}}(t) = P^i_{T_{in}}(T_{in}) - V_{T_{in}}(T_{in})\Delta t - G_{T_{in}}\frac{\Delta t^2}{2} - S_{T_{in}}(t) \quad (12)$$

Let us assume that the camera provides $n_t$ images of the same N characteristic points at consecutive instants $t_j$, j=1 to $n_t$, and $t_1 = T_{in} < t_2 < \ldots < t_{n_t} = T_{end}$.

To simplify the notation, from this point onward, the following notation is adopted:

$P^i_j \equiv P^i_{T_{in}}(t_j), i=1$ to $N; j=1$ to $n_t$;

$P^i \equiv P^i_{T_{in}}(T_{in}), i=1$ to $N$;

$V \equiv V_{T_{in}}(T_{in})$;

$G \equiv G_{T_{in}}$;

$S_j \equiv S_{T_{in}}(t_j), j=1$ to $n_t$.

Furthermore, the unit vector which has the same direction as $P^i_j$ is called $\mu^i_j$.

And we introduce the unknowns $\lambda^i_j$ such that $P^i_j = \lambda^i_j \cdot \mu^i_j$.

Without loss of generality, we fix $T_{in} = 0$, i.e. $\Delta t = t$.

The set of inertial sensors 4 provides $\mu^i_j$ and $S_j$ for i=1 to N; j=1 to $n_t$.

Equation (11) can be written in the following manner:

$$P^i - Vt_j - Gt_j^2/2 - \lambda^i_j \cdot \mu^i_j = S_j \quad (12)$$

The problem is the determination of the vectors $P^i$, i=1 to N, V and G. It is possible to use equation (12) to determine these vectors, thus making it necessary to also determine the values $\lambda^i_j$. By considering j=1 in equation (12), i.e. $t_j = t_1 = T_{in} = 0$, we easily obtain $P^i = \lambda_1^i \cdot \mu_1^i$. It is then possible to write the linear system of equation (12) as the following system of two equations (13):

$$Gt_j^2/2 - Vt_j + \mu_1^1 \cdot \mu_1^1 - \lambda_j^1 \cdot \mu_j^1 = S_j$$

$$\lambda_1^1 \cdot \mu_1^1 - \lambda_j^1 \cdot \mu_j^1 - \lambda_1^i \cdot \mu_1^i + \lambda_j^i \cdot \mu_j^i = 0_3$$

where j=2 to $n_t$, i=2 to N and $0_3$ is the zero vector of dimensions 3×1.

This system of linear equations (13) consists of $3(n_t-1)N$ equations in $N \cdot n_t + 6$ unknowns.

Let us define the vectors with two columns X and S, and the matrix $\phi$:

$$X \equiv [G^T, V^T, \lambda_1^1, \ldots, \lambda_1^N, \ldots, \lambda_{n_i}^1, \ldots, \lambda_{n_i}^N]^T$$

$$S \equiv [S_2^T, 0_3, \ldots, 0_3, S_3^T, 0_3, \ldots, 0_3, \ldots, S_{n_i}^T, 0_3, \ldots, 0_3]^T$$

$$\Phi \equiv \begin{bmatrix} T_2 & S_2 & \mu_1^1 & 0_3 & 0_3 & -\mu_2^1 & 0_3 & 0_3 & 0_3 & 0_3 & 0_3 \\ 0_{33} & 0_{33} & \mu_1^1 & -\mu_1^2 & 0_3 & -\mu_2^1 & \mu_2^2 & 0_3 & 0_3 & 0_3 & 0_3 \\ \cdots & \cdots & \cdots & \cdots & \cdots & \cdots & \cdots & \cdots & \cdots & \cdots & \cdots \\ 0_{33} & 0_{33} & \mu_1^1 & 0_3 & -\mu_1^N & -\mu_2^1 & 0_3 & \mu_2^N & 0_3 & 0_3 & 0_3 \\ \cdots & \cdots & \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots & \cdots & \cdots \\ & & \mu_1^1 & 0_3 & 0_3 & 0_3 & 0_3 & 0_3 & -\mu_{n_i}^1 & 0_3 & 0_3 \\ 0_{33} & 0_{33} & \mu_1^1 & -\mu_1^2 & 0_3 & 0_3 & 0_3 & 0_3 & -\mu_{n_i}^1 & \mu_{n_i}^2 & 0_3 \\ \cdots & \cdots & \cdots & \cdots & \cdots & \cdots & \cdots & \cdots & \cdots & \cdots & \cdots \\ 0_{33} & 0_{33} & \mu_1^1 & 0_3 & -\mu_1^N & 0_3 & 0_3 & 0_3 & -\mu_{n_i}^1 & 0_3 & \mu_{n_i}^N \end{bmatrix}$$

where $$T_j \equiv -\frac{t_j^2}{2}I_3,$$

$S_j = -t_j I_3$ and $I_3$ is the identity matrix of dimensions $3 \times 3$; $0_{33}$ is the zero matrix of dimensions $3 \times 3$ (it is noted that the third set of columns disappears in case of absence of error).

The system of linear equations (13) may thus be written in a compact manner:

$$\phi X = S \quad (14).$$

The data of the set of inertial sensors 4 are contained in this linear system. Furthermore, it is assumed that the amplitude of the gravitational acceleration is known a priori. This additional item of information is added to the linear system via the following quadratic equation: $|G| = g$. By introducing the matrix $\Pi$ of dimensions $3 \times (N \cdot n_i + 6)$, with $\pi \equiv [I_3, 0_3, \ldots, 0_3]$, this quadratic constraint can be written as a function of X in the following manner:

$$|\pi X|^2 = g^2. \quad (15)$$

The problem is therefore solved by determining the vector X that satisfies equations (14) and (15).

In the document mentioned hereinabove, A. Martinelli, "Vision and IMU Data Fusion: Closed-Form Solutions for Attitude, Speed, Absolute Scale and Bias Determination", Transaction on Robotics, Volume 28 (2012), Issue 1 (February), pp. 44-60, it is shown that there exists a unique solution, two distinct solutions or an infinity of solutions. When the matrix $\phi$ is of full rank, the vector X can readily be obtained from equation (14) and the solution is unique. This is in general the case when two characteristic points are observed at least during four consecutive images.

By using just three images, two distinct solutions for these angles are in general provided, but, in most cases, one of them can be eliminated.

It is also possible to determine the angles of roll and pitch on the basis of a single characteristic point, but, in this case, an additional image is required.

Once the vector X has been determined, the gravity in the absolute frame $R_G$ is also determined since its components are the first three entries of X.

The invention claimed is:

1. A method for determining, in a 3D fixed frame of reference ($R_G$), the location of a mobile machine provided with an image sensor associated with a first 3D local frame of reference ($R_I$) corresponding to a captured image of the environment of the mobile machine, said captured image being obtained by said sensor and comprising at least two characteristic points of said environment,
said method being characterized in that it comprises using the angles of roll and of pitch of the mobile machine in the fixed frame of reference corresponding to said captured image as inputs for the method, and implementing the following steps in relation to said captured image, so as to determine the angle of yaw and/or the coordinates of the mobile machine in the fixed frame of reference:
a) defining a second local frame of reference ($R_n$) with respect to the mobile machine by applying two successive rotations to the first local frame of reference, one rotation being about a first axis of the first local frame of reference and being dependent on the input angle of roll, and the other rotation being about a second axis of the first local frame of reference and being dependent on the input angle of pitch, said second local frame of reference ($R_n$) comprising a third axis exhibiting a known deviation of angle from the yaw axis of the fixed frame of reference;
b) multiplying, for each of the two characteristic points ($P_1$, $P_2$), matrix defining said succession of two rotations, by a matrix of intrinsic parameters of the image sensor and by the coordinates of the pixel respectively corresponding to said each characteristic point on the captured image so as to obtain two common-factored points, and calculating coordinate quotients for each coordinate of a given common-factored point as the division of a coordinate of the given common-factored point along an axis by the coordinate of said given common-factored point along the third axis, whereby the common factor of the two common-factored points is circumvented;
c) expressing coordinates of the two characteristic points in said second local frame of reference as a function of the distance (D) between said characteristic points and of said coordinate quotients, the angle of yaw (YW) of the mobile machine in the fixed frame of reference corresponding to said captured image being determined as a function of the arctan function applied to a variable dependent on the coordinates, in said second local frame of reference ($R_n$), of a vector joining the two characteristic points ($P_1$, $P_2$).

2. The method for determining the location of a mobile machine as claimed in claim 1, according to which the coordinates of the mobile machine in the fixed frame of reference ($R_G$) corresponding to said captured image are calculated as a function of coordinates of at least one of said characteristic points and of said angle of yaw (YW) determined in the fixed frame of reference.

3. The method for determining the location of a mobile machine as claimed in claim 1, according to which, being given three characteristic points ($P_1$, $P_2$, $P_3$) in the plane perpendicular to the yaw axis (YW) of the fixed frame of reference ($R_G$), the following steps are implemented in relation to said captured image:
for each of the three pairs of characteristic points, steps b) and c) are implemented and three values of angles of yaw are thus determined as a function of the roll and pitch values determined in the previous step;
on the basis of the three determined values of angles of yaw, a procedure for minimizing a function $\cos t(\lambda) =$ $(YW_{13}-YW_{12}-\gamma_1)^2+(YW_{23}-YW_{12}-\gamma_2)^2$ is implemented in which the variables $YW_{13}, YW_{12}$ and $YW_{23}$ are non-linear functions of $\lambda=\lfloor Roll,Pitch \rfloor^T$ where $\gamma_1$ and $\gamma_{72}$ represent two internal angles of the triangle of vertices of said characteristic points;

as a function of the roll and pitch values arising from this minimization procedure, steps b) and c) are implemented in relation to two of the characteristic points, and thus an angle of yaw in the fixed frame of reference is determined.

4. The method for determining the location of a mobile machine as claimed in claim 3, comprising a step of determining the angles $\gamma_1$ and $\gamma_2$, according to which we calculate:

$$\gamma_1 = \arccos\left(\frac{a^2+b^2-c^2}{2ab}\right)$$

and $$\gamma_2 = \pi - \arccos\left(\frac{a^2+c^2-b^2}{2ac}\right),$$

where $$a=\sqrt{(\mu_2-\mu_1)^2+(v_2-v_1)^2} \; b=\sqrt{(\mu_3-\mu_1)^2+(v_3-v_1)^2} \; c=\sqrt{(\mu_3-\mu_2)^2+(v_3-v_2)^2},$$

the values $$\mu_i = \frac{x_i}{z_{i1}}$$

and $$v_i = \frac{y_i}{z_i},$$

where $$\begin{bmatrix} x_i \\ y_i \\ z_i \end{bmatrix}$$

are the coordinates of the characteristic point $P_i$ in the second local frame of reference, i=1 to 3, being determined on the basis of the following equalities:

$$\lambda \cdot \begin{bmatrix} x_i \\ y_i \\ z_i \end{bmatrix} = Rot \cdot A^{-1} \cdot \begin{bmatrix} u_i \\ v_i \\ 1 \end{bmatrix},$$

where $u_i$, $v_i$ are the coordinates of a pixel of the representation of the characteristic point $P_i$ in the image, A is the predetermined matrix of parameters intrinsic to the image sensor, $\lambda$ the common-factor of unknown value; and Rot is the matrix representing the succession of the two rotations.

5. The method for determining the location of a mobile machine as claimed in claim 4, according to which said step of determining the angles $\gamma_1$ and $\gamma_2$ is implemented in a Kalman filter procedure observation phase.

6. The method for determining the location of a mobile machine as claimed in claim 1, according to which the fixed frame of reference ($R_G$) is defined such that the first characteristic point is the origin thereof, that the yaw axis (Z) is of direction contrary to the gravity vector and that the second characteristic point is of coordinate equal to zero on the pitch axis (Y) of the fixed frame of reference.

7. The method for determining the location of a machine as claimed in claim 1, according to which an axis ($Z_n$) of the second local frame of reference ($R_n$) is chosen parallel to the yaw axis (Z) of the fixed frame of reference ($R_G$).

8. The method for determining the location of a mobile machine as claimed in claim 6, according to which, when the two characteristic points have one and the same coordinate value on the yaw axis (Z) of the fixed frame of reference, the coordinate value z of the location of the mobile machine on the yaw axis of the fixed frame of reference is:

$$z = \pm \frac{D}{\sqrt{\Delta\mu^2 + \Delta v^2}}$$

with $\Delta\mu=\mu_1-\mu_2$; $\Delta v=v_1-v_2$ and D the distance between the two characteristic points, $$\mu_1 = \frac{x_1}{z_1}, v_1 = \frac{y_1}{z_1}, \mu_2 = \frac{x_2}{z_2}$$

and $$v_2 = \frac{y_2}{z_2}$$

where $$\begin{bmatrix} x_1 \\ y_1 \\ z_1 \end{bmatrix}$$

and $$\begin{bmatrix} x_2 \\ y_2 \\ z_2 \end{bmatrix}$$

are the coordinates of the two characteristic points in the second local frame of reference ($R_n$).

9. The method for determining the location of a mobile machine as claimed in claim 6, according to which, when the two characteristic points do not have one and the same coordinate value on the yaw axis of the fixed frame of reference, the coordinate value z of the location of the mobile machine on the yaw axis (Z) of the fixed frame of reference is a solution of:

$$(\Delta\mu^2 + \Delta v^2)\left(\frac{z}{D}\right)^2 - 2(\Delta\mu\mu_2 + \Delta v v_2)\frac{\Delta z}{D}\frac{z}{D} + \left(\frac{\Delta z}{D}\right)^2 - 1 = 0$$

with $\Delta\mu=\mu_1-\mu_2$; $\Delta v=v_1-v_2$ and D the distance between the two characteristic points, $$\mu_1 = \frac{x_1}{z_1}, v_1 = \frac{y_1}{z_1}, \mu_2 = \frac{x_2}{z_2}$$

and $$v_2 = \frac{y_2}{z_2}$$

wherein $$\begin{bmatrix} x_1 \\ y_1 \\ z_1 \end{bmatrix}$$

and $$\begin{bmatrix} x_2 \\ y_2 \\ z_2 \end{bmatrix}$$

and where and are the coordinates of the two characteristic points in the second local frame of reference.

10. The method for determining the location of a mobile machine as claimed in claim 8, comprising a step of determining the angle of yaw YW of the mobile machine in the fixed frame of reference ($R_G$) with the aid of the following formula:

$$YW = -\theta = -2\cdot\arctan\frac{-z(v_2 - v_1)}{\sqrt{(z(\mu_2 - \mu_1))^2 + (z(v_2 - v_1))^2} + (-z(\mu_2 - \mu_1))}.$$

11. The method for determining the location of a mobile machine as claimed in claim 8, comprising at least one of steps i) and ii) hereinbelow, with $$-\theta = -2\cdot\arctan\frac{-z(v_2 - v_1)}{\sqrt{(z(\mu_2 - \mu_1))^2 + (z(v_2 - v_1))^2} + (-z(\mu_2 - \mu_1))}.$$

i) a step of determining the coordinate x of the location of the mobile machine on the roll axis of the second fixed frame of reference ($R_e$) by calculating $x=\cos\theta\cdot z\cdot\mu_1+\sin\theta\cdot z\cdot v_1$;

ii) a step of determining the coordinate y of the mobile machine on the pitch axis (Y) of the fixed frame of reference by calculating $y=-\sin\theta\cdot z\cdot\mu_1+\cos\theta\cdot z\cdot v_1$.

12. The method for determining the location of a mobile machine claimed in claim 8, according to which $$\mu_1 = \frac{x_1}{z_1}, v_1 = \frac{y_1}{z_1},$$

$$\mu_2 = \frac{x_2}{z_2}$$

and $$v_2 = \frac{y_2}{z_2}$$

are calculated on the basis of the following equalities:

$$\lambda\cdot\begin{bmatrix} x_1 \\ y_1 \\ z_1 \end{bmatrix} = Rot\cdot A^{-1}\cdot\begin{bmatrix} u_1 \\ v_1 \\ 1 \end{bmatrix},$$

where $u_1$, $v_1$ are the coordinates of a pixel of the representation of one of the two characteristic points in the image; and $$\lambda\cdot\begin{bmatrix} x_2 \\ y_2 \\ z_2 \end{bmatrix} = Rot\cdot A^{-1}\cdot\begin{bmatrix} u_2 \\ v_2 \\ 1 \end{bmatrix},$$

where $u_2$, $v_2$ are the coordinates of a pixel of the representation of the other of the two characteristic points in the image, A is a predetermined matrix of parameters intrinsic to the image sensor, $\lambda$ a factor of unknown value; and Rot is the matrix representing the succession of the two rotations.

13. The method for determining the location of a mobile machine as claimed in claim 7, according to which, when the two characteristic points have one and the same coordinate value on the yaw axis (Z) of the fixed frame of reference, the coordinate value z of the location of the mobile machine on the yaw axis of the fixed frame of reference is:

$$z = \pm\frac{D}{\sqrt{\Delta\mu^2 + \Delta v^2}}$$

with $\Delta\mu=\mu_1-\mu_2$; $\Delta v=v_1-v_2$ and D the distance between the two characteristic points, $$\mu_1 = \frac{x_1}{z_1}, v_1 = \frac{y_1}{z_1}, \mu_2 = \frac{x_2}{z_2}$$

and $$v_2 = \frac{y_2}{z_2}$$

where $$\begin{bmatrix} x_1 \\ y_1 \\ z_1 \end{bmatrix}$$

and $$\begin{bmatrix} x_2 \\ y_2 \\ z_2 \end{bmatrix}$$

are the coordinates of the two characteristic points in the second local frame of reference ($R_n$).

14. The method for determining the location of a mobile machine as claimed in claim 7, according to which, when the two characteristic points do not have one and the same coordinate value on the yaw axis of the fixed frame of reference, the coordinate value z of the location of the mobile machine on the yaw axis (Z) of the fixed frame of reference is a solution of:

$$(\Delta\mu^2 + \Delta v^2)\left(\frac{z}{D}\right)^2 - 2(\Delta\mu\mu_2 + \Delta v v_2)\frac{\Delta z}{D}\frac{z}{D} + \left(\frac{\Delta z}{D}\right)^2 - 1 = 0$$

with $\Delta\mu = \mu_1 - \mu_2$; $\Delta v = v_1 - v_2$ and D the distance between the two characteristic points, $$\mu_1 = \frac{x_1}{z_1}, v_1 = \frac{y_1}{z_1}, \mu_2 = \frac{x_2}{z_2}$$

and $$v_2 = \frac{y_2}{z_2}$$

where $$\begin{bmatrix} x_1 \\ y_1 \\ z_1 \end{bmatrix}$$

and $$\begin{bmatrix} x_2 \\ y_2 \\ z_2 \end{bmatrix}$$

are the coordinates of the two characteristic points in the second local frame of reference.

15. The method for determining the location of a mobile machine as claimed in claim 9, comprising a step of determining the angle of yaw YW of the mobile machine in the fixed frame of reference ($R_G$) with the aid of the following formula:

$$YW = -\theta = -2 \cdot \arctan\frac{-z(v_2 - v_1)}{\sqrt{(z(\mu_2 - \mu_1))^2 + (z(v_2 - v_1))^2} + (-z(\mu_2 - \mu_1))}.$$

16. The method for determining the location of a mobile machine as claimed in claim 9, comprising at least one of steps i) and ii) hereinbelow, with $$-\theta = -2 \cdot \arctan\frac{-z(v_2 - v_1)}{\sqrt{(z(\mu_2 - \mu_1))^2 + (z(v_2 - v_1))^2} + (-z(\mu_2 - \mu_1))}.$$

i) a step of determining the coordinate x of the location of the mobile machine on the roll axis of the second fixed frame of reference ($R_n$) by calculating $x = \cos\theta \cdot z \cdot \mu_1 + \sin\theta \cdot z \cdot v_1$;

ii) a step of determining the coordinate y of the mobile machine on the pitch axis (Y) of the fixed frame of reference by calculating $y = -\sin\theta \cdot z \cdot \mu_1 + \cos\theta \cdot z \cdot v_1$.

17. The method for determining the location of a mobile machine claimed in claim 9, according to which $$\mu_1 = \frac{x_1}{z_1}, v_1 = \frac{y_1}{z_1},$$

$$\mu_2 = \frac{x_2}{z_2}$$

and $$v_2 = \frac{y_2}{z_2}$$

are calculated on the basis of the following equalities:

$$\lambda \cdot \begin{bmatrix} x_1 \\ y_1 \\ z_1 \end{bmatrix} = Rot \cdot A^{-1} \cdot \begin{bmatrix} u_1 \\ v_1 \\ 1 \end{bmatrix},$$

where $u_1$, $v_1$ are the coordinates of a pixel of the representation of one of the two characteristic points in the image; and $$\lambda \cdot \begin{bmatrix} x_2 \\ y_2 \\ z_2 \end{bmatrix} = Rot \cdot A^{-1} \cdot \begin{bmatrix} u_2 \\ v_2 \\ 1 \end{bmatrix},$$

where $u_2$, $v_2$ are the coordinates of a pixel of the representation of the other of the two characteristic points in the image, A is a predetermined matrix of parameters intrinsic to the image sensor, λ.a factor of unknown value; and Rot is the matrix representing the succession of the two rotations.

18. A computer program stored on a non-transitory computer-readable medium for locating, in a 3D fixed frame of reference ($R_G$), a mobile machine provided with an image sensor associated with a first 3D local frame of reference ($R_I$) corresponding to a captured image of the environment of the mobile machine, said captured image being obtained by said sensor and comprising at least two characteristic points of said environment, said program comprising instructions for implementing the steps of a method as claimed in claim 1 during an execution of the program by processing means, the angles of roll and of pitch of the mobile machine in the fixed frame of reference corresponding to said captured image being inputs.

19. A device for determining, in a 3D fixed frame of reference ($R_G$), the location of a mobile machine provided with an image sensor associated with a first 3D local frame of reference ($R_I$) corresponding to a captured image of the environment of the mobile machine, said captured image being obtained by said sensor and comprising at least two characteristic points of said environment, said determining device being adapted for using angles of roll and of pitch of the mobile machine in the fixed frame of reference corresponding to said captured image as inputs;

said determining device being characterized in that it is furthermore adapted to determine the angle of yaw and/or the coordinates of the mobile machine in the fixed frame of reference by defining a second local frame of reference ($R_n$) with respect to the mobile machine by applying two successive rotations to the first local frame of reference, one rotation being about a first axis of the first local frame of reference and being dependent on the input angle of roll, and the other rotation being about a second axis of the first local frame of reference and being dependent on the angle of pitch, said second local frame of reference ($R_n$) comprising a third axis exhibiting a known deviation of angle from the yaw axis of the fixed frame of reference;

said determining device being characterized in that it is furthermore adapted to multiply, for each of the two characteristic points ($P_1$, $P_2$), matrix defining said succession of two rotations by a matrix of intrinsic parameters of the image sensor and by the coordinates of the pixel respectively corresponding to said each characteristic point on the captured image, so as to obtain two common-factored points, and to calculate coordinate quotients for each coordinate of a given common-factored point as the division of a coordinate of the given common-factored point along an axis by the coordinate of said given common-factored point along the third axis, whereby the common factor of the two common-factored points is circumvented;

said determining device being characterized in that it is furthermore adapted to express coordinates of the two characteristic points in said second local frame of reference as a function of the distance (D) between said characteristic points and of said coordinate quotients, the angle of yaw (YW) of the mobile machine in the fixed frame of reference corresponding to said captured image being determined as a function of the arctan function applied to a variable dependent on the coordinates in said second local frame of reference ($R_n$), of a vector joining the two characteristic points ($P_1$, $P_1$).

* * * * *